US012686744B2

(12) United States Patent
Pei et al.

(10) Patent No.: US 12,686,744 B2
(45) Date of Patent: Jul. 21, 2026

(54) METHOD FOR PREPARING ALIPHATIC POLYKETONE BY CONTINUOUS SOLUTION POLYMERIZATION PROCESS AND ALIPHATIC POLYKETONE

(71) Applicant: CHAMBROAD CHEMICAL INDUSTRY RESEARCH INSTITUTE CO., LTD., Binzhou (CN)

(72) Inventors: Lijun Pei, Binzhou (CN); Zhaoyu Ren, Binzhou (CN); Yingxian Liu, Binzhou (CN); Pengpeng Wang, Binzhou (CN); Liyan Cao, Binzhou (CN); Pengpeng Zhang, Binzhou (CN); Ruijing Wang, Binzhou (CN)

(73) Assignee: CHAMBROAD CHEMICAL INDUSTRY RESEARCH INSTITUTE CO., LTD., Binzhou (CN)

( * ) Notice: Subject to any disclaimer, the term of this patent is extended or adjusted under 35 U.S.C. 154(b) by 532 days.

(21) Appl. No.: 18/265,977

(22) PCT Filed: Apr. 29, 2022

(86) PCT No.: PCT/CN2022/090287
§ 371 (c)(1),
(2) Date: Jun. 8, 2023

(87) PCT Pub. No.: WO2023/151192
PCT Pub. Date: Aug. 17, 2023

(65) Prior Publication Data
US 2024/0376263 A1 Nov. 14, 2024

(30) Foreign Application Priority Data
Feb. 11, 2022 (CN) ......................... 202210128845.3

(51) Int. Cl.

| | |
|---|---|
| ***C08G 67/02*** | (2006.01) |
| ***B01J 31/12*** | (2006.01) |
| ***B01J 31/24*** | (2006.01) |
| ***C08K 5/07*** | (2006.01) |

(52) U.S. Cl.
CPC ............ *C08G 67/02* (2013.01); *B01J 31/122* (2013.01); *B01J 31/2404* (2013.01); *C08K 5/07* (2013.01); *C08K 2201/005* (2013.01)

(58) Field of Classification Search
CPC .......... C08G 67/02; C08K 5/07; B01J 31/122; B01J 31/2404
See application file for complete search history.

(56) References Cited

U.S. PATENT DOCUMENTS

| | | | | |
|---|---|---|---|---|
| 5,959,045 A * | 9/1999 | Johns | .................. | B01J 19/1881 528/392 |
| 2008/0058493 A1 | 3/2008 | Kwon et al. | | |
| 2008/0167438 A1 | 7/2008 | Watanabe et al. | | |
| 2021/0395453 A1 | 12/2021 | Hellbach et al. | | |

FOREIGN PATENT DOCUMENTS

| | | | |
|---|---|---|---|
| CN | 101134813 | A | 3/2008 |
| CN | 101137695 | A | 3/2008 |
| CN | 102020767 | A | 4/2011 |
| CN | 104324752 | A | 2/2015 |
| CN | 111607077 | A | 9/2020 |
| CN | 112011048 | A | 12/2020 |
| CN | 112839980 | A | 5/2021 |
| EP | 0788405 | A1 | 8/1997 |
| JP | H1160727 | A | 3/1999 |
| JP | 2001098066 | A | 4/2001 |
| KR | 101145176 | B1 | 5/2012 |
| KR | 102134158 | B1 | 7/2020 |
| WO | 2013140273 | A1 | 9/2013 |

OTHER PUBLICATIONS

Takahashi et al. Anionic Polymerization Using Flow Microreactors. Molecules, vol. 24, 1532, pp. 1-19. (Year: 2019).*
First Office Action dated Jun. 26, 2024 for Japanese patent application No. 2023-536145, English translation provided by Global Dossier.
Chinese First Office Action issued on Apr. 11, 2025 for the Chinese priority application No. 202210128845.3.
European Search Report issued on Oct. 17, 2024 for the European counterpart application No. 22902467.4.
International Search Report for PCT/CN2022/090287 mailed Oct. 26, 2022, ISA/CN.

* cited by examiner

*Primary Examiner* — Sikarl A Witherspoon
(74) *Attorney, Agent, or Firm* — Yue (Robert) Xu; Apex Attorneys at Law, LLP

(57) ABSTRACT

The present disclosure provides a method for preparing aliphatic polyketone by continuous solution polymerization process and aliphatic polyketone; the method comprises the following steps: a) continuously feeding carbon monoxide, an olefin compound and a solvent system containing catalyst into a continuous flow reactor for solution polymerization to obtain an aliphatic polyketone; wherein the aliphatic polyketone has a particle size of 10 μm~50 μm, a particle size distribution width Span of 0.5~0.9, and a bulk density>0.35 g/ml. Compared with the prior art, in the method provided by the present disclosure, a solvent system containing a catalyst is adopted, and a continuous solution polymerization reaction is conducted to realize continuous feeding and continuous discharging, thereby effectively solving the problems such as difficulty in controlling the morphology of polymer particles, easy material hanging on the wall, low single-pot yield, and poor product repeatability in the traditional batch slurry process.

9 Claims, 1 Drawing Sheet

METHOD FOR PREPARING ALIPHATIC POLYKETONE BY CONTINUOUS SOLUTION POLYMERIZATION PROCESS AND ALIPHATIC POLYKETONE

CROSS REFERENCE TO RELATED APPLICATIONS

This application is the national phase of International Application No. PCT/CN2022/090287, titled "METHOD FOR PREPARING ALIPHATIC POLYKETONE BY CONTINUOUS SOLUTION POLYMERIZATION PROCESS AND ALIPHATIC POLYKETONE", filed on Apr. 29, 2022, which claims the priority to Chinese Patent Application No. 202210128845.3, titled "METHOD FOR PREPARING ALIPHATIC POLYKETONE BY CONTINUOUS SOLUTION POLYMERIZATION PROCESS AND ALIPHATIC POLYKETONE", filed on Feb. 11, 2022 with the China National Intellectual Property Administration, which are incorporated herein by reference in entirety.

FIELD

The present disclosure relates to the field of chemical industry, and in particular to a method for preparing aliphatic polyketone by continuous solution polymerization process and aliphatic polyketone.

BACKGROUND

Carbon monoxide is the main by-product of many petroleum, coal and other energy and petrochemical industries. Converting carbon monoxide into high value-added products is an important part of the chemical industry. Nowadays, with the decreasing of oil resources day by day and the increasingly serious resource crisis, under the background of "carbon neutrality", the development of one-carbon chemical industry has very important practical significance and broad development prospects. Polyketone (POK) is a new type of green polymer material obtained by copolymerization of carbon monoxide and olefin, wherein the carbon monoxide accounts for about 50% of the total mass of polyketone. POK has excellent environmental friendliness in terms of raw material composition and energy consumption, and has excellent impact strength, chemical resistance, abrasion resistance, gas barrier property and flame retardancy, which can replace PA, PBT, POM, EVOH and other materials in automotive, electronics and packaging application fields, leading to a wide range of application prospects.

The research and development of polyketone began in the 1940s. At present, only Hyosung Group in South Korea has realized the industrialization of polyketone, the production process of which is a slurry polymerization process. The research on polyketone by domestic and foreign institutions is limited to the existing slurry polymerization process, while the polyketone solution polymerization process has not been reported in the literature. The traditional batch slurry polymerization process has problems such as difficulty in controlling the morphology of polymer particles, easy material hanging on the wall, low single-pot yield and poor product repeatability. In addition, the increase of insoluble products in the process of kettle slurry polymerization will result in difficult mass transfer and heat transfer in the reaction process, which also brings technical difficulties and safety risks to the industrial production of polyketone.

SUMMARY

In view of this, the purpose of the present disclosure is to provide a new method for preparing aliphatic polyketone by continuous solution polymerization process and a prepared aliphatic polyketone. The new method provided by the present disclosure can solve the problems in the slurry process such as difficulty in controlling the morphology of polymer particles, easy material hanging on the wall, low single-pot yield, poor product repeatability, poor mass and heat transfer, ensuring the smoothness of the polyketone production process and greatly improving product quality, production capacity and equipment investment.

The present disclosure provides an aliphatic polyketone prepared by continuous solution polymerization process, wherein the aliphatic polyketone is obtained by continuous solution polymerization of carbon monoxide and an olefin compound in a solvent system containing a catalyst; wherein the aliphatic polyketone has a particle size of 10 μm~50 μm, a particle size distribution width Span of 0.5~0.9, and a bulk density>0.35 g/ml.

Preferably, the aliphatic polyketone has a weight average molecular weight>200,000, and a molecular weight distribution<2.0.

Preferably, the solvent system containing a catalyst is a mixed solvent containing a catalyst, a cocatalyst and a cosolvent.

Preferably, the catalyst is an organometallic complex of a divalent palladium salt and a bidentate phosphine ligand;

The divalent palladium salt is one or more of palladium nitrate, palladium sulfate, palladium sulfonate and palladium acetate;

The bidentate phosphine ligand has a structure as shown in formula (I):

formula (I)

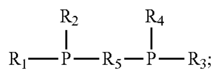

In formula (I), $R_1$, $R_2$, $R_3$ and $R_4$ are independently selected from phenyl or substituted phenyl, and $R_5$ is an alkylene group having at least 3 carbon atoms.

Preferably, the cocatalyst is selected from one or more of sulfuric acid, benzenesulfonic acid, perchloric acid, trichloroacetic acid and trifluoroacetic acid.

Preferably, the cosolvent is a carboxylic acid-functionalized imidazolium salt, which has a structure as shown in formula (II):

formula (II)

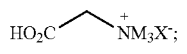

In formula (II), $—NM_3$ is an imidazole substituent, and X is trifluoroacetate, trifluorosulfonate or hexafluorophosphate.

Preferably, the mixed solvent is a mixed solvent o-chlorophenol and methanol, a mixed solvent of m-cresol and methanol, a mixed solvent of hexafluoroisopropanol and methanol, or a mixed solvent of DMF and methanol.

The present disclosure also provides a method for preparing the aliphatic polyketone described in the above technical solution by continuous solution polymerization process, comprising the following steps:

a) Continuously feeding carbon monoxide, an olefin compound and a solvent system containing catalyst into a continuous flow reactor for solution polymerization to obtain an aliphatic polyketone.

Preferably, the solution polymerization reaction in step a) is carried out at a temperature of 100° C.~110° C., and a pressure of 6.5 MPa~7 MPa;

The residence time of the solution polymerization reaction is controlled by controlling the feeding rate of the monomer and solvent;

The solution polymerization reaction is carried out using a micro-channel reactor, in which the monomer is continuously feeding, the unreacted monomer is separated and reused, and the product is continuously discharged.

Preferably, the step a) further comprises:

Performing gas-liquid separation on the reaction solution obtained by the polymerization reaction, reusing the gas, and removing the solvent from the liquid to obtain polyketone powder;

A method for removing the solvent is flash evaporation; the recovered solvent can be recycled for use as a mixed solvent.

The present disclosure provides a method for preparing aliphatic polyketone by continuous solution polymerization process and aliphatic polyketone; the method comprises the following steps: a) continuously feeding carbon monoxide, an olefin compound and a solvent system containing catalyst into a continuous flow reactor for solution polymerization to obtain an aliphatic polyketone; wherein the aliphatic polyketone has a particle size of 10 μm~50 μm, a particle size distribution width Span of 0.5~0.9, and a bulk density>0.35 g/ml. Compared with the prior art, in the method provided by the present disclosure, carboxylic acid functionalized imidazolium salts are selected as cosolvents, mixed solvents such as o-chlorophenol and methanol, m-cresol and methanol, hexafluoroisopropanol and methanol, DMF and methanol are selected as solvents of the continuous solution polymerization reaction, and the continuous flow reactor is used for continuous feeding and continuous discharging, which effectively solves problems such as difficulty in controlling the morphology of polymer particles, easy material hanging on the wall, low single-pot yield, and poor product repeatability in the traditional batch slurry process. Aliphatic polyketones with a weight average molecular weight>200,000, a molecular weight distribution<2.0, a bulk density>0.35 g/ml, a particle size of 10 μm~50 μm, and a particle size distribution width Span of 0.5~0.9 can be obtained through the polymerization.

Figure 1:
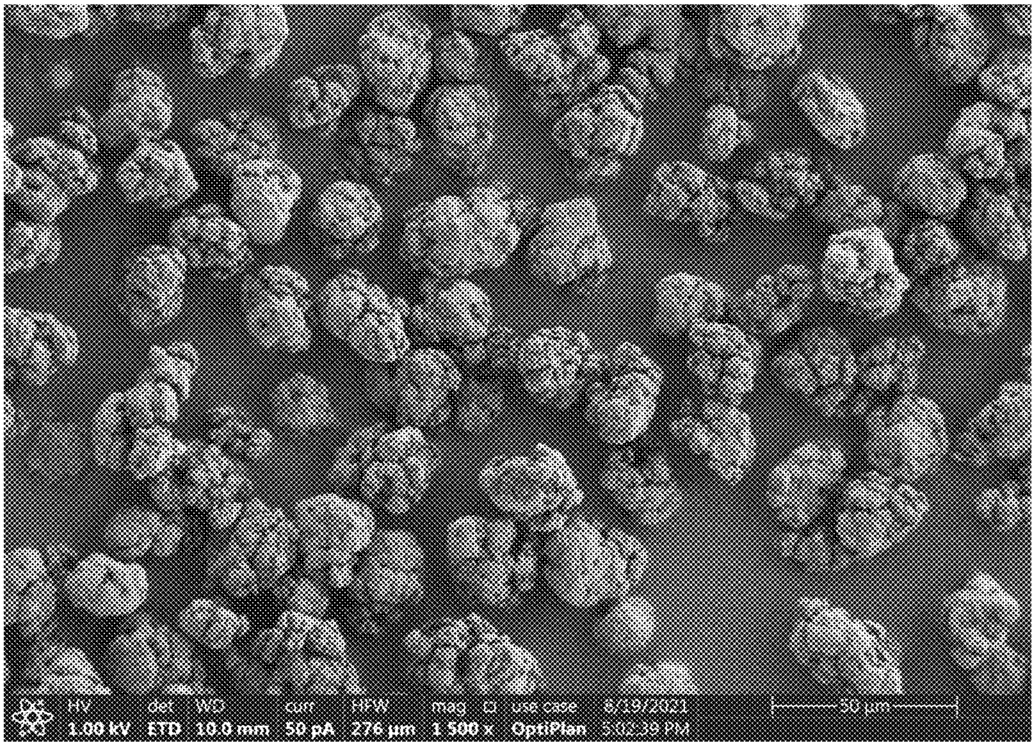
FIG. 1 is the scanning electron microscope image of the polyketone powder prepared in Example 1 of the present disclosure.

Table 1 is the particle size distribution data of the polyketone powder prepared in Example 1 of the present disclosure;

Table 2 is the particle size distribution data of the polyketone powder prepared in Comparative Example 1;

Table 3 is the particle size distribution data of the polyketone powder prepared in Comparative Example 2;

Table 4 is the particle size distribution data of the polyketone powder prepared in Example 2 of the present disclosure;

Table 5 is the particle size distribution data of the polyketone powder prepared in Example 3 of the present disclosure.

DETAILED DESCRIPTION

The technical solutions of the present disclosure will be clearly and completely described below with reference to the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative efforts shall fall within the protection scope of the present disclosure.

The present disclosure provides an aliphatic polyketone prepared by continuous solution polymerization process, wherein the aliphatic polyketone is obtained by continuous solution polymerization of carbon monoxide and an olefin compound in a solvent system containing catalyst; wherein the aliphatic polyketone has a particle size of 10 μm~50 μm, a particle size distribution width Span of 0.5~0.9, and a bulk density>0.35 g/ml.

In the present disclosure, the aliphatic polyketone has a weight average molecular weight preferably >200,000, and a molecular weight distribution preferably <2.0.

In the present disclosure, the solvent system containing a catalyst is preferably a mixed solvent containing a catalyst, a cocatalyst and a cosolvent. In the present disclosure, the catalyst is preferably an organometallic complex of a divalent palladium salt and a bidentate phosphine ligand; wherein, the divalent palladium salt is preferably one or more of palladium nitrate, palladium sulfate, palladium sulfonate and palladium acetate, more preferably palladium nitrate, palladium sulfate, palladium sulfonate or palladium acetate, further more preferably palladium acetate. In the present disclosure, there is no special restriction on the source of the divalent palladium salt, and commercially available products well known to those skilled in the art may be used.

In the present disclosure, the bidentate phosphine ligand preferably has a structure as shown in formula (I):

formula (I)

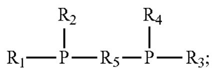

In formula (I), $R_1$, $R_2$, $R_3$ and $R_4$ are independently selected from phenyl or substituted phenyl, and $R_5$ is an alkylene group having at least 3 carbon atoms; preferably specifically: 1,3-bis[bis(2-methoxyphenyl)phosphino]propane.

In the present disclosure, the content of the catalyst in the mixed solvent is preferably 0.01-0.05 mmol/L, specifically 0.01 mmol/L, 0.02 mmol/L, 0.03 mmol/L, 0.04 mmol/L, 0.05 mmol/L/L.

In the present disclosure, the cocatalyst is preferably selected from one or more of sulfuric acid, benzenesulfonic acid, perchloric acid, trichloroacetic acid and trifluoroacetic acid, more preferably sulfuric acid, benzenesulfonic acid, perchloric acid, trichloroacetic acid or trifluoroacetic acid, further more preferably trifluoroacetic acid. In the present disclosure, there is no special restriction on the source of the cocatalyst, and any commercially available products of the above-mentioned organic and inorganic strong acids well known to those skilled in the art can be used. In the present disclosure, the molar ratio of the cocatalyst to the catalyst is preferably (10~2): 1, specifically 10:1, 9:1, 8:1, 7:1, 6:1, 5:1, 4:1, 3:1, 2:1.

In the present disclosure, the cosolvent is preferably a carboxylic acid functionalized imidazolium salt, which has a structure as shown in formula (II):

formula (II)

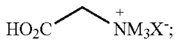

In formula (II), —$NM_3$ is an imidazole substituent, and X is trifluoroacetate, trifluorosulfonate or hexafluorophosphate. In the present disclosure, the cosolvent can improve the solubility of monomers and products in the solvent and enhance the mass transfer effect. In the present disclosure, the molar ratio of the cosolvent to the catalyst is preferably (5-15): 1, more preferably 10:1.

In the present disclosure, the content of the cosolvent in the mixed solvent is preferably 0.1~0.5 mmol/L.

In the present disclosure, the mixed solvent is preferably a mixed solvent of o-chlorophenol and methanol, a mixed solvent of m-cresol and methanol, a mixed solvent of hexafluoroisopropanol and methanol or a mixed solvent of DMF and methanol, more preferably a mixed solvent of hexafluoroisopropanol and methanol. In a preferred embodiment of the present disclosure, the mixed solvent is a mixed solvent of hexafluoroisopropanol and methanol; wherein, the volume ratio of the methanol to hexafluoroisopropanol is preferably 1:(3-6), specifically 1:3, 1:4, 1:5, 1:6.

The present disclosure also provides a method for preparing the aliphatic polyketone described in the above technical solution by continuous solution polymerization process, comprising the following steps:

a) Continuously feeding carbon monoxide, an olefin compound and a solvent system containing catalyst into a continuous flow reactor for solution polymerization reaction to obtain an aliphatic polyketone.

In the present disclosure, the solvent system containing a catalyst is preferably a mixed solvent containing a catalyst, a cocatalyst and a cosolvent. In the present disclosure, firstly a catalyst, a cocatalyst and a cosolvent are dissolved in a mixed solvent to obtain a solvent system containing a catalyst.

In the present disclosure, the catalyst is preferably an organometallic complex of a divalent palladium salt and a bidentate phosphine ligand; wherein, the divalent palladium salt is preferably one or more of palladium nitrate, palladium sulfate, palladium sulfonate and palladium acetate, more preferably palladium nitrate, palladium sulfate, palladium sulfonate or palladium acetate, further more preferably palladium acetate. In the present disclosure, there is no special restriction on the source of the divalent palladium salt, and commercially available products well known to those skilled in the art may be used.

In the present disclosure, the bidentate phosphine ligand preferably has a structure as shown in formula (I):

formula (I)

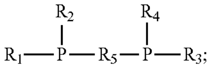

In formula (I), $R_1$, $R_2$, $R_3$ and $R_4$ are independently selected from phenyl or substituted phenyl, and $R_5$ is an alkylene group having at least 3 carbon atoms; preferably specifically: 1,3-bis[bis(2-methoxyphenyl)phosphino]propane.

In the present disclosure, the content of the catalyst in the mixed solvent is preferably 0.01-0.05 mmol/L, specifically 0.01 mmol/L, 0.02 mmol/L, 0.03 mmol/L, 0.04 mmol/L, 0.05 mmol/L/L.

In the present disclosure, the cocatalyst is preferably selected from one or more of sulfuric acid, benzenesulfonic acid, perchloric acid, trichloroacetic acid and trifluoroacetic acid, more preferably sulfuric acid, benzenesulfonic acid, perchloric acid, trichloroacetic acid or trifluoroacetic acid, further more preferably trifluoroacetic acid. In the present disclosure, there is no special restriction on the source of the cocatalyst, and any commercially available products of the above-mentioned organic and inorganic strong acids well known to those skilled in the art can be used. In the present disclosure, the molar ratio of the cocatalyst to the catalyst is preferably (10~2): 1, specifically 10:1, 9:1, 8:1, 7:1, 6:1, 5:1, 4:1, 3:1, 2:1.

In the present disclosure, the cosolvent is preferably a carboxylic acid functionalized imidazolium salt, which has a structure as shown in formula (II):

formula (II)

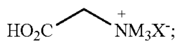

In formula (II), —$NM_3$ is an imidazole substituent, and X is trifluoroacetate, trifluorosulfonate or hexafluorophosphate. In the present disclosure, the cosolvent can improve the solubility of the monomers and products in the solvent and enhance the mass transfer effect. In the present disclosure, the molar ratio of the cosolvent to the catalyst is preferably (5-15): 1, more preferably 10:1.

In the present disclosure, the content of the cosolvent in the mixed solvent is preferably 0.1~0.5 mmol/L.

In the present disclosure, the mixed solvent is preferably a mixed solvent of o-chlorophenol and methanol, a mixed solvent of m-cresol and methanol, a mixed solvent of hexafluoroisopropanol and methanol or a mixed solvent of DMF and methanol, more preferably a mixed solvent of hexafluoroisopropanol and methanol. In a preferred embodiment of the present disclosure, the mixed solvent is a mixed solvent of hexafluoroisopropanol and methanol; wherein, the volume ratio of the methanol to hexafluoroisopropanol is preferably 1:(3-6), specifically 1:3, 1:4, 1:5, 1:6.

In the present disclosure, subsequently, carbon monoxide, an olefin compound and the above mixed solvent containing a catalyst, a cocatalyst and a cosolvent are continuously fed into a continuous flow reactor, and reaction temperature, reaction pressure and residence time are controlled to perform a solution polymerization reaction. In the present disclosure, the solution polymerization reaction is carried out at a temperature of 100° C.~110° C., and a pressure of 6.5 MPa~7 MPa.

In the present disclosure, the residence time of the solution polymerization reaction is preferably controlled by controlling the feeding rate of the monomer and the solvent; the monomer described here is a mixture of carbon monoxide with one or more of olefinic unsaturated compounds, wherein the molar ratio of the olefin to carbon monoxide is preferably (0.5~5): 1; the solvent is the mixed solvent described in the above technical solution. In the present disclosure, the solvent can be recycled for use.

In the present disclosure, the solution polymerization reaction is carried out using a micro-channel reactor. The micro-channel reactor is a continuous plug flow reactor capable of realizing efficient heat exchange and mass transfer, and which can make a reaction completed quickly with higher temperature, higher concentration and faster mixing in controlled time and space, so as to achieve the comprehensive effect of improving conversion rate, improving safety and improving efficiency. On this basis, the present disclosure can realize continuous feeding of monomers, separation and reuse of unreacted monomers, and continuous discharge of products.

In the present disclosure, before the reaction starts in the microchannel reactor, firstly nitrogen is introduced for replacement, after the replacement is completed, the heating module of the reactor is heated to the reaction temperature, and then materials are continuously fed into the reactor.

The present disclosure also comprises:

Performing gas-liquid separation on the reaction solution obtained by the polymerization reaction, reusing the gas, and removing the solvent from the liquid to obtain polyketone powder;

A method for removing the solvent is flash evaporation; the recovered solvent can be recycled for use as a mixed solvent.

In the present disclosure, when the system pressure is higher than the reaction pressure, the reaction solution starts to be continuously and stably extracted into a gas-liquid separation equipment for gas-liquid separation; the gas obtained by separation is reused, and the solvent is removed from the liquid to obtain polyketone powder.

In the present disclosure, a method for removing the solvent is preferably flash evaporation, and a flash evaporation tank well known to those skilled in the art can be used; the recovered solvent can be recycled for use as a mixed solvent.

In the present disclosure, the solvent is removed by flash evaporation to obtain polyketone powder with dense and uniform particles, and the solvent is recovered and reused.

In the present disclosure, the continuous solution polymerization process is developed preferably using a microchannel reactor, in which materials are continuously fed and discharged under the premise of ensuring normal progress of the reaction, solving the problems of wall hanging, poor mass transfer and heat transfer caused by product aggregation in the traditional batch process. After the reaction is completed, the reaction solution is separated, the unreacted monomers are recovered, and preferably the solvent is removed by flash evaporation to obtain a product with uniform and stable particle morphology.

In the present disclosure, the organometallic complex of divalent palladium salt and bidentate phosphine ligand is used as the main catalyst, strong acid is used as the cocatalyst, carboxylic acid functionalized imidazolium salt is used as the cosolvent, and a group of mixed solvents such as o-chlorophenol and methanol, m-cresol and methanol, hexafluoroisopropanol and methanol, DMF and methanol and the like is selected for use as reaction reagents, and the reactants are carbon monoxide, ethylene and propylene gas. The monomer is continuously fed, the reaction temperature, pressure and residence time are controlled, the reaction solution is continuously extracted, the unreacted monomer can be recovered and reused, and the solvent can be removed and reused by flash evaporation to obtain polyketone powder with a weight average molecular weight>200,000, a molecular weight distribution<2.0, a powder particle size of 10 μm~50 μm, a particle size distribution width Span of 0.5~0.9, and a bulk density>0.35 g/ml. The slurry polymerization process mentioned in the present disclosure has poor mass transfer and heat transfer effects, so the obtained polyketone product has large and fluffy particles and serious wall hanging problem, which has a powder bulk density of 0.1~0.2 g/mL, a powder particle size of 20~480 μm, and a particle size distribution width Span of 3.3~4.0; whereas the polyketone product obtained by the solution polymerization process has finer and denser particles with a bulk density>0.35 g/ml, a powder particle size of 10 μm~50 μm and a particle size distribution width Span of 0.5~0.9.

The present disclosure provides a method for preparing aliphatic polyketone by continuous solution polymerization process and aliphatic polyketone; the method comprises the following steps: a) continuously feeding carbon monoxide, an olefin compound and a solvent system containing catalyst into a continuous flow reactor for solution polymerization to obtain an aliphatic polyketone; wherein the aliphatic polyketone has a particle size of 10 μm~50 μm, a particle size distribution width Span of 0.5~0.9, and a bulk density>0.35 g/ml. Compared with the prior art, in the method provided by the present disclosure, carboxylic acid functionalized imidazolium salts are selected as cosolvents, mixed solvents such as o-chlorophenol and methanol, m-cresol and methanol, hexafluoroisopropanol and methanol, DMF and methanol are selected as solvents of the continuous solution polymerization reaction, and the continuous flow reactor is used for continuous feeding and continuous discharging, which effectively solves problems such as difficulty in controlling the morphology of polymer particles, easy material hanging on the wall, low single-pot yield, and poor product repeatability in the traditional batch slurry process. Aliphatic polyketones with a weight average molecular weight>200,000, a molecular weight distribution<2.0, a bulk density>0.35 g/ml, a particle size of 10 μm~50 μm, and a particle size distribution width Span of 0.5~0.9 can be obtained through the polymerization.

In order to further illustrate the present disclosure, the following examples are used for detailed description. The raw materials used in the following examples of the present disclosure are all commercially available products; the terpolymer of CO, ethylene and propylene was prepared according to the following method.

Example 1

A main catalyst an organometallic complex of 1,3-bis[bis(2-methoxyphenyl)phosphino]propane and palladium acetate, a cocatalyst trifluoroacetic acid and a cosolvent carboxylic acid functionalized imidazolium salt were added to a quantitative mixture of methanol and hexafluoroisopropanol (V methanol:V hexafluoroisopropanol=1:4), wherein the concentration of the main catalyst was 0.02 mmol/L, the concentration of the cocatalyst was 0.08 mmol/L, and the concentration of the cosolvent was 0.2 mmol/L. Before the start of the reaction, a microchannel reactor was introduced with nitrogen for replacement. After the replacement was completed, the heating module of the reactor was heated to 100° C., and then the reactor (the flux of the reactor was 50 ml) was continuously introduced with the mixed solution at a flow rate of 5 ml/min, propylene at a flow rate of 0.6 g/min, and a mixed gas of CO and ethylene at a mass ratio of 1:1.1 at a feeding rate of 30 g/min. The system was prepared to a reaction pressure of 6.5 MPa~7.0 MPa, and the residence time was controlled to be 10 min. When the system pressure was higher than the reaction pressure, the reaction solution started to be extracted into a gas-liquid separation equipment, the gas was reused, and the liquid was introduced into a flash evaporation tank and removed off the solvent by flash evaporation to obtain polyketone powder with dense and uniform particles, and the solvent was recovered and reused. The obtained polyketone powder has a weight-average molecular weight of 220,000, a molecular weight distribution of 1.8, a bulk density of 0.37 g/ml, a particle size of 10 μm~50 μm, and a particle size distribution width Span of 0.507.

The particle size of the powder is shown in Table 1; the scanning electron microscope image of the powder is shown in FIG. 1.

TABLE 1

Particle size distribution data of the polyketone powder prepared in Example 1 of the present disclosure

| Sample name | Particle refractive index | $D_{10}$ | $D_{50}$ | $D_{90}$ |
|---|---|---|---|---|
| Polyketone powder | 1.5 | 23.2 | 28.0 | 37.4 |

Comparative Example 1

3.5 L methanol solvent, a main catalyst an organometallic complex of 1,3-bis[bis(2-methoxyphenyl)phosphino]propane and palladium acetate 48.58 mg, and a cocatalyst trifluoroacetic acid 3.4 mg were added to a 10 L autoclave. After the above-mentioned substances were added, the autoclave was introduced with nitrogen for pressure maintaining and replacement, then introduced with 400 g of propylene, and 350 g of a mixed gas of CO and $C_2H_4$ at a mass ratio of 1:1.1. The reaction system began to be heated up to a set temperature of 95° C. After the temperature was constant, the mixed gas of CO:$C_2H_4$=1:1.1 was continuously introduced, wherein the reaction pressure was maintained at 3.5 MPa~4.0 MPa, the stirring speed was 400 r/min, and the reaction time was 2 h.

After the reaction was completed, the obtained polyketone powder product was filtered, washed with methanol, and then dried under vacuum at 80° C. for 3 hours to obtain polyketone powder. The obtained polyketone powder has a weight-average molecular weight of 190,000, a molecular weight distribution of 2.2, a bulk density of 0.18 g/ml, a particle size of 20 μm~480 μm and a particle size distribution width Span of 3.954.

Figure 2:
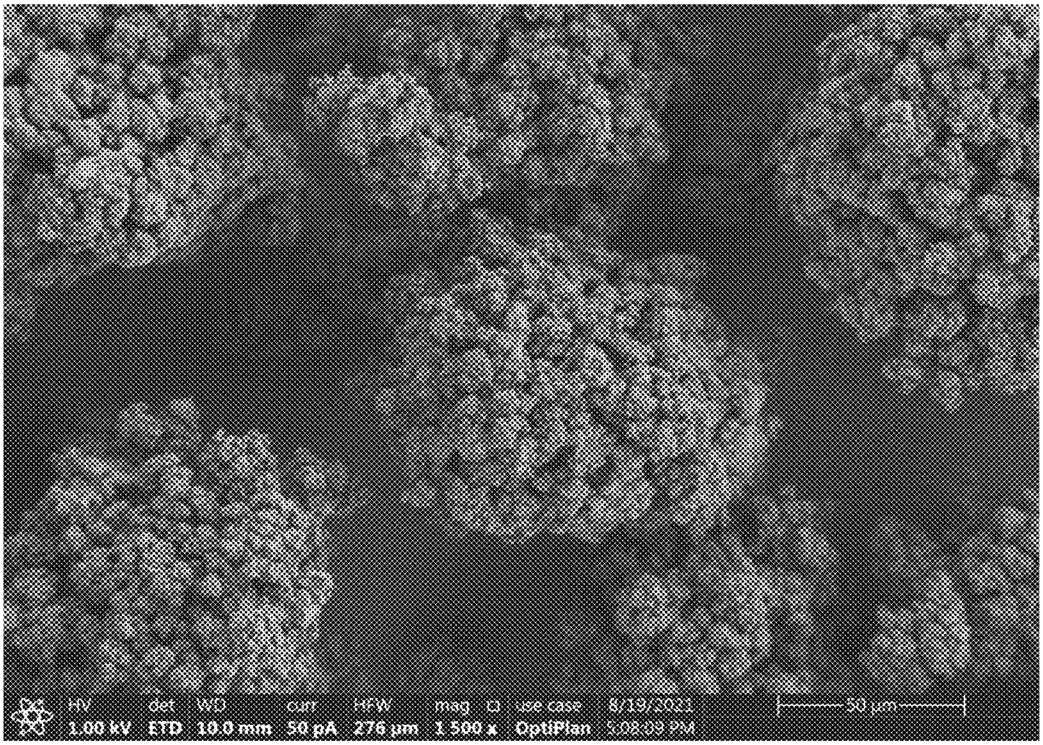
FIG. 2 is the scanning electron microscope image of the polyketone powder prepared in Comparative Example 1.

The particle size of the powder is shown in Table 2; the scanning electron microscope image of the powder is shown in FIG. 2.

TABLE 2

Particle size distribution data of the polyketone powder prepared in Comparative Example 1

| Sample name | Particle refractive index | $D_{10}$ | $D_{50}$ | $D_{90}$ |
|---|---|---|---|---|
| Polyketone powder | 1.5 | 35.1 | 111 | 474 |

Comparative Example 2

3.5 L methanol solvent, a main catalyst an organometallic complex of 1,3-bis[bis(2-methoxyphenyl)phosphino]propane and palladium acetate 48.58 mg, and a cocatalyst trifluoroacetic acid 3.4 mg were added to a 10 L autoclave. After the above-mentioned substances were added, the autoclave was introduced with nitrogen for pressure maintaining and replacement, then introduced with 400 g of propylene, and 350 g of a mixed gas of CO and $C_2H_4$ at a mass ratio of 1:1.1. The reaction system began to be heated up to a set temperature of 100° C. After the temperature was constant, the mixed gas of CO:$C_2H_4$=1:1.05 was continuously introduced, wherein the reaction pressure was maintained at 3.5 MPa~4.0 MPa, the stirring speed was 400 r/min, and the reaction time was 2.5 h.

After the reaction was completed, the obtained polyketone powder product was filtered, washed with methanol, and then dried under vacuum at 80° C. for 3 hours to obtain polyketone powder. The obtained polyketone powder has a weight-average molecular weight of 179,000, a molecular weight distribution of 2.25, a bulk density of 0.16 g/ml, a particle size of 20 μm~480 μm and a particle size distribution width Span of 3.371.

The particle size of the powder is shown in Table 3.

TABLE 3

Particle size distribution data of the polyketone powder prepared in Comparative Example 2

| Sample name | Particle refractive index | $D_{10}$ | $D_{50}$ | $D_{90}$ |
|---|---|---|---|---|
| Polyketone powder | 1.5 | 25.8 | 103 | 373 |

Example 2

A main catalyst an organometallic complex of 1,3-bis[bis(2-methoxyphenyl) phosphino]propane and palladium acetate, a cocatalyst trifluoroacetic acid and a cosolvent carboxylic acid functionalized imidazolium salt were added to a quantitative mixture of methanol and hexafluoroisopropanol (V methanol:V hexafluoroisopropanol=1:4), wherein the concentration of the main catalyst was 0.02 mmol/L, the concentration of the cocatalyst was 0.08 mmol/L, and the concentration of the cosolvent was 0.2 mmol/L. Before the start of the reaction, a microchannel reactor was introduced with nitrogen for replacement. After the replacement was completed, the heating module of the reactor was heated to 110° C., and then the reactor (the flux of the reactor was 50 ml) was continuously introduced with the mixed solution at a flow rate of 5 ml/min, propylene at a flow rate of 0.6 g/min, and a mixed gas of CO and ethylene at a mass ratio of 1:1.1 at a feeding rate of 30 g/min. The system was prepared to a reaction pressure of 6.5 MPa~7.0 MPa, and the residence time was controlled to be 10 min. When the system pressure was higher than the reaction pressure, the reaction solution started to be extracted into a gas-liquid separation equipment, the gas was reused, and the liquid was introduced into a flash evaporation tank and removed off the solvent by flash evaporation to obtain polyketone powder with dense and uniform particles, and the solvent was recovered and reused. The obtained polyketone powder has a weight-average molecular weight of 205,000, a molecular weight distribution of 1.75, a bulk density of 0.38 g/ml, a particle size of 10 μm~50 μm, and a particle size distribution width Span of about 0.776.

The particle size of the powder is shown in Table 4.

TABLE 4

| Particle size distribution data of the polyketone powder prepared in Example 2 of the present disclosure | | | | |
|---|---|---|---|---|
| Sample name | Particle refractive index | $D_{10}$ | $D_{50}$ | $D_{90}$ |
| Polyketone powder | 1.5 | 20.5 | 28.6 | 42.7 |

Example 3

A main catalyst an organometallic complex of 1,3-bis[bis(2-methoxyphenyl)phosphino]propane and palladium acetate, a cocatalyst trifluoroacetic acid and a cosolvent carboxylic acid functionalized imidazolium salt were added to a quantitative mixture of methanol and hexafluoroisopropanol (V methanol:V hexafluoroisopropanol=1:4), wherein the concentration of the main catalyst was 0.02 mmol/L, the concentration of the cocatalyst was 0.08 mmol/L, and the concentration of the cosolvent was 0.2 mmol/L. Before the start of the reaction, a microchannel reactor was introduced with nitrogen for replacement. After the replacement was completed, the heating module of the reactor was heated to 100° C., and then the reactor (the flux of the reactor was 50 ml) was continuously introduced with the mixed solution at a flow rate of 10 ml/min, propylene at a flow rate of 1.2 g/min, and a mixed gas of CO and ethylene at a mass ratio of 1:1.1 at a feeding rate of 60 g/min. The system was prepared to a reaction pressure of 6.5 MPa~7.0 MPa, and the residence time was controlled to be 5 min. When the system pressure was higher than the reaction pressure, the reaction solution started to be extracted into a gas-liquid separation equipment, the gas was reused, and the liquid was introduced into a flash evaporation tank and removed off the solvent by flash evaporation to obtain polyketone powder with dense and uniform particles, and the solvent was recovered and reused. The obtained polyketone powder has a weight-average molecular weight of 201,000, a molecular weight distribution of 1.95, a bulk density of 0.35 g/ml, a particle size of 10 μm~50 μm, and a particle size distribution width Span of about 0.826.

The particle size of the powder is shown in Table 5.

TABLE 5

| Particle size distribution data of the polyketone powder prepared in Example 3 of the present disclosure | | | | |
|---|---|---|---|---|
| Sample name | Particle refractive index | $D_{10}$ | $D_{50}$ | $D_{90}$ |
| Polyketone powder | 1.5 | 18.1 | 30.5 | 43.3 |

The above are only the preferred embodiments of the present disclosure. It should be noted that for those of ordinary skill in the art, several improvements and modifications can be made without departing from the principles of the present disclosure, which should also be regarded as the protection scope of the present disclosure.

The invention claimed is:

1. An aliphatic polyketone prepared by continuous solution polymerization process, wherein the aliphatic polyketone is obtained by continuous solution polymerization of carbon monoxide and an olefin compound in a solvent system containing a catalyst; wherein the aliphatic polyketone has a particle size of 10 μm~50 μm, a particle size distribution width Span of 0.5~0.9, and a bulk density>0.35 g/ml;

wherein the solvent system containing a catalyst is a mixed solvent containing a catalyst, a cocatalyst and a cosolvent, wherein the cosolvent is a carboxylic acid-functionalized imidazolium salt, which has a structure as shown in formula (II):

formula (II)

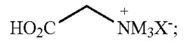

in formula (II), $—NM_3$ is an imidazole substituent, and X is trifluoroacetate, trifluorosulfonate or hexafluorophosphate.

2. The aliphatic polyketone prepared by continuous solution polymerization process according to claim 1, wherein the aliphatic polyketone has a weight-average molecular weight>200,000 and a molecular weight distribution<2.0.

3. The aliphatic polyketone prepared by continuous solution polymerization process according to claim 1, wherein the catalyst is an organometallic complex of a divalent palladium salt and a bidentate phosphine ligand;

the divalent palladium salt is one or more of palladium nitrate, palladium sulfate, palladium sulfonate and palladium acetate;

the bidentate phosphine ligand has a structure as shown in formula (I):

formula (I)

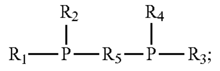

in formula (I), $R_1$, $R_2$, $R_3$ and $R_4$ are independently selected from phenyl or substituted phenyl, and $R_5$ is an alkylene group having at least 3 carbon atoms.

4. The aliphatic polyketone prepared by continuous solution polymerization process according to claim 1, wherein the cocatalyst is selected from one or more of sulfuric acid, benzenesulfonic acid, perchloric acid, trichloroacetic acid and trifluoroacetic acid.

5. The aliphatic polyketone prepared by continuous solution polymerization process according to claim 1, wherein the mixed solvent is a mixed solvent of o-chlorophenol and methanol, a mixed solvent of m-cresol and methanol, a mixed solvent of hexafluoroisopropanol and methanol or a mixed solvent of DMF and methanol.

6. A method for preparing the aliphatic polyketone according to claim 1 by continuous solution polymerization process, comprising the following steps:

a) continuously feeding carbon monoxide, an olefin compound and a solvent system containing catalyst into a continuous flow reactor for solution polymerization to obtain an aliphatic polyketone;

wherein the solvent system containing a catalyst is a mixed solvent containing a catalyst, a cocatalyst and a cosolvent, wherein the cosolvent is a carboxylic acid-functionalized imidazolium salt, which has a structure as shown in formula (II):

formula (II)

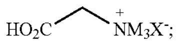

in formula (II), —$NM_3$ is an imidazole substituent, and X is trifluoroacetate, trifluorosulfonate or hexafluorophosphate.

7. The method according to claim 6, wherein the solution polymerization reaction in step a) is carried out at a temperature of 100° C.~110° C., and a pressure of 6.5 MPa~7 MPa;

the residence time of the solution polymerization reaction is controlled by controlling the feeding rate of monomer and solvent;

the solution polymerization reaction is carried out using a micro-channel reactor, in which the monomer is continuously feeding, the unreacted monomer is separated and reused, and the product is continuously discharged.

8. The method according to claim 6, wherein the step a) further comprises:

performing gas-liquid separation on the reaction solution obtained by the polymerization reaction, reusing the gas, and removing the solvent from the liquid to obtain polyketone powder;

a method for removing the solvent is flash evaporation; the recovered solvent can be recycled for use as a mixed solvent.

9. The method according to claim 7, wherein the step a) further comprises:

performing gas-liquid separation on the reaction solution obtained by the polymerization reaction, reusing the gas, and removing the solvent from the liquid to obtain polyketone powder;

a method for removing the solvent is flash evaporation; the recovered solvent can be recycled for use as a mixed solvent.

* * * * *